(12) United States Patent
Law et al.

(10) Patent No.: US 9,036,084 B2
(45) Date of Patent: May 19, 2015

(54) APPARATUS AND METHOD FOR SYNCHRONOUS DISPLAY OF VIDEO DATA

(71) Applicant: QUALCOMM Incorporated, San Diego, CA (US)

(72) Inventors: Henry Hing Law, Scarborough (CA); Tung Chuen Kwong, Richmond Hill (CA); Benjamin Koon Pan Chan, Markham (CA); William Lloyd Atkinson, Markham (CA); Wilson Hung Yu, Markham (CA)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/244,608

(22) Filed: Apr. 3, 2014

(65) Prior Publication Data
US 2014/0307168 A1   Oct. 16, 2014

Related U.S. Application Data

(60) Provisional application No. 61/811,074, filed on Apr. 11, 2013.

(51) Int. Cl.
H04N 5/66 (2006.01)
H04N 9/12 (2006.01)
H04N 5/04 (2006.01)
G06F 3/14 (2006.01)
G09G 5/12 (2006.01)

(52) U.S. Cl.
CPC .............. H04N 5/04 (2013.01); G06F 3/1446 (2013.01); G09G 5/12 (2013.01); G09G 2340/0435 (2013.01)

(58) Field of Classification Search
USPC ............ 348/383, 510–512, 536, 547; 345/1.3
See application file for complete search history.

(56) References Cited

U.S. PATENT DOCUMENTS

| 5,155,595 | A  | * | 10/1992 | Robison | ........................ 348/500 |
| 7,034,853 | B2 | * | 4/2006  | Cho et al. | ........................ 345/1.3 |
| 8,264,421 | B2 | * | 9/2012  | Yamada et al. | ................. 345/1.1 |
| 8,432,437 | B2 |   | 4/2013  | Shintani | |
| 8,436,786 | B2 | * | 5/2013  | Kamoto | .......................... 345/1.1 |
| 8,483,960 | B2 | * | 7/2013  | Smitherman | ................. 701/468 |

(Continued)

FOREIGN PATENT DOCUMENTS

EP          1785981 A1    5/2007
WO    WO-2012077392 A1    6/2012
WO    WO-2013190144 A1   12/2013

OTHER PUBLICATIONS

International Search Report and Written Opinion—PCT/US2014/033047—ISA/EPO—Jul. 14, 2014.

Primary Examiner — Victor Kostak
(74) Attorney, Agent, or Firm — Knobbe Martens Olson & Bear LLP

(57) ABSTRACT

The apparatus and method for displaying video data are disclosed. Reference refresh frequency and/or time may be predetermined or derived from predetermined values. Measured refresh frequency and/or time of display panels may be determined and compared against the reference refresh frequency and/or time. Based on the comparisons and through one or more control loops, display properties of the display panels may be adjusted so that one or more display panels may be in sync with respect to their refresh timings without dedicated hardware or a common hardwired synchronization signal.

30 Claims, 13 Drawing Sheets

(56) References Cited

U.S. PATENT DOCUMENTS

| | | | |
|---|---|---|---|
| 8,487,834 B2 * | 7/2013 | Naito et al. | 345/2.2 |
| 2004/0252400 A1 * | 12/2004 | Blank et al. | 360/70 |
| 2005/0093854 A1 | 5/2005 | Kennedy et al. | |
| 2005/0174482 A1 * | 8/2005 | Yamada et al. | 348/383 |
| 2007/0033289 A1 * | 2/2007 | Nuyttens et al. | 709/230 |
| 2010/0111491 A1 * | 5/2010 | Kamoto | 386/66 |
| 2010/0156757 A1 * | 6/2010 | Naito et al. | 345/1.1 |
| 2010/0315427 A1 | 12/2010 | Wyatt et al. | |
| 2011/0043514 A1 | 2/2011 | Hussain et al. | |
| 2013/0159401 A1 * | 6/2013 | Sukeno et al. | 709/203 |
| 2013/0321701 A1 | 12/2013 | Halna et al. | |
| 2014/0022457 A1 * | 1/2014 | Derer | 348/536 |
| 2014/0028907 A1 * | 1/2014 | Nuyttens et al. | 348/383 |
| 2014/0053214 A1 * | 2/2014 | Walker et al. | 725/62 |

* cited by examiner

FIG. 1B (A 4×3 grid of display tile blocks, each labeled 104, containing:)

Figure 1B:
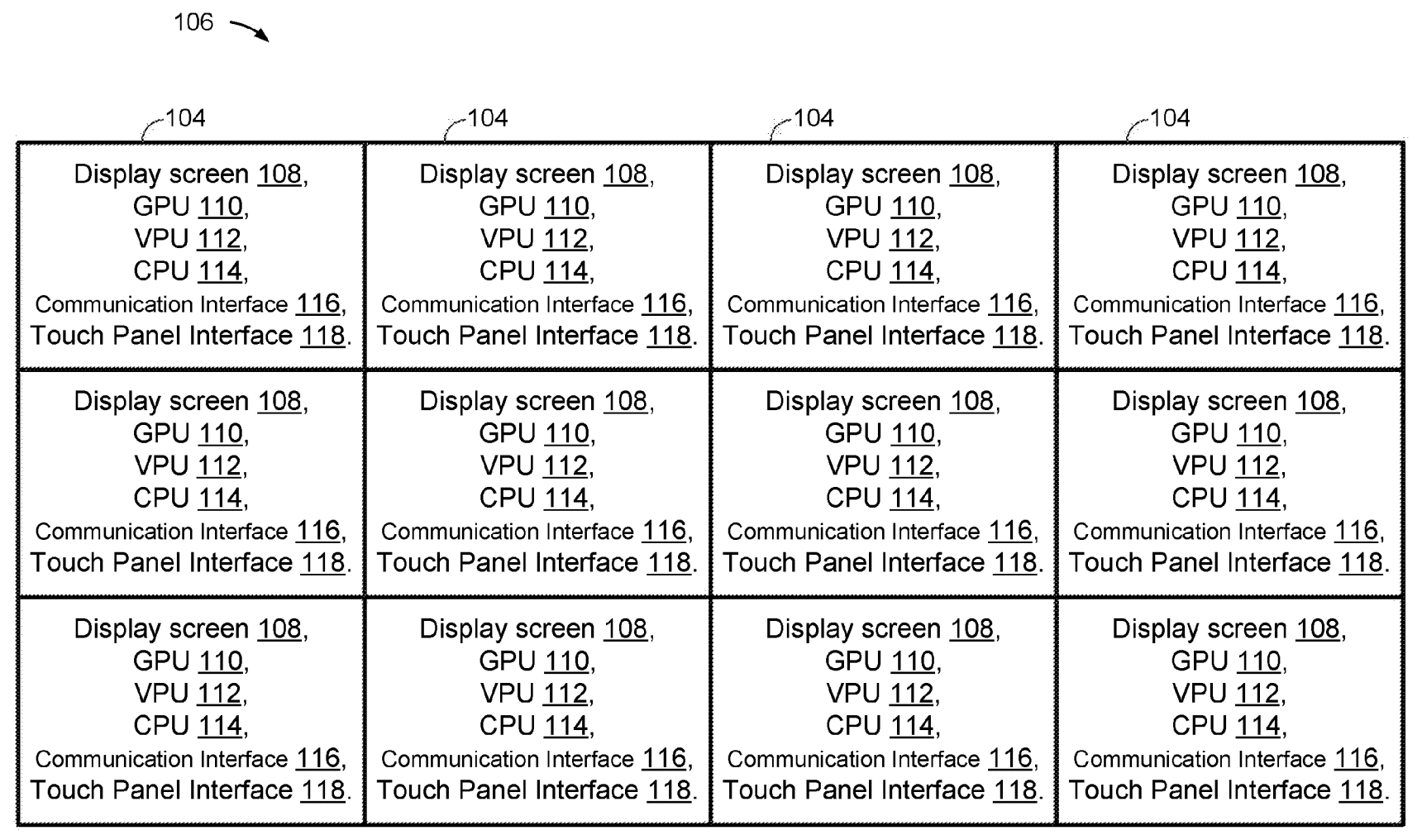

Display screen 108,
GPU 110,
VPU 112,
CPU 114,
Communication Interface 116,
Touch Panel Interface 118.

The overall grid is labeled 106.

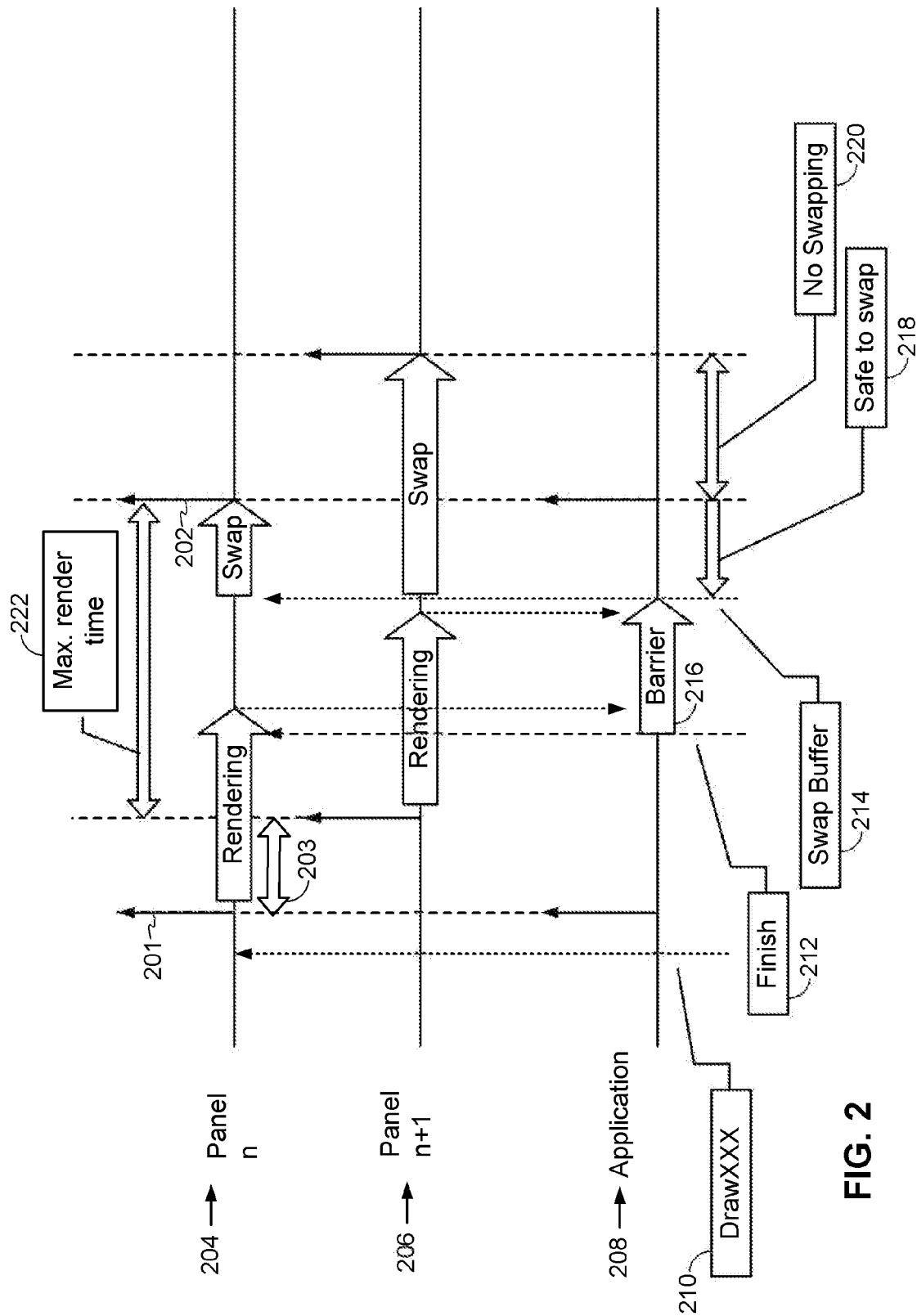

APPARATUS AND METHOD FOR SYNCHRONOUS DISPLAY OF VIDEO DATA

CROSS-REFERENCE TO RELATED APPLICATION

This application claims the benefit of U.S. Provisional Application No. 61/811,074, filed Apr. 11, 2013, titled "SOFTWARE GENLOCK FOR AN ARRAY OF SMART PANELS," the entirety of which is hereby incorporated by reference.

TECHNICAL FIELD

This disclosure relates to techniques for outputting graphics and video for display.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Some applications may involve sending video data to multiple display panels in a tiled arrangement to display a single video output across multiple displays.

One key challenge is to present a unified and synchronized display across all panels. Because of difference in oscillator due to temperature and voltage variances, the same programming on the same type of display hardware will have different refresh rate and different VSYNC timing and may result in undesirable visual artifacts. For example, if there is 500 part per million difference (500 PPM) which is about 0.5 millisecond error for every 1 second (~43 seconds per day). In case of 60 Hz refresh rate (e.g., 16.6 milliseconds for every cycle), it takes about 33 sec to deviate by almost 1 video frame for the 500 PPM difference. Most of the display programming is double buffered to avoid tearing, and the setup of the display submission to the display hardware will have the effect on the next frame starting from VSYNC. Different VSYNC timing results in different time display update on different panels, and in turn, results in visual artifact across an array of panels.

One possible solution is to make all panels have common refresh timing, often referred to as "genlock." Issuing a common buffer swap is typically accomplished by swap barrier in flipping graphical content as soon as all the renderings are finished or by timestamp in displaying video in a constant movie playback rate (for example, 24 fps). Common refresh timing (e.g., genlock) is usually handled with hardware that is configured to implement refresh timing using a master synchronization signal.

One possible genlock synchronization may involve a single graphics/display controller with an adaptor for each display panels. Although this solution may allow each display interface be configured in the same graphic card to produce the same display refresh property to different panels for the genlock synchronization, it may not be easy to make this solution scalable to more than the adaptor's limit on the specific card, such as potentially to support up to six display panels, but no more. Limited GPU capability and memory size restriction may occur in a single graphics card.

Another possible solution may involve multiple display controllers using dedicated hardware for a master genlock signal to drive multiple displays. Although this solution may take advantage of distributing parallel processing power and graphics processing unit (GPU) capability and memory may not be a problem, this solution requires additional software swap (flip) synchronization mechanism such as a swap barrier. This solution may involve requiring hardware enhancement to provide a frame genlock master signal for display timing to each display device mainly in PC. It may be complicated and expensive to add additional displays because of the hardware requirement of feeding the sync signal from the master to every "special" display controller in the group.

Another possible solution may involve using a cable to wire a parallel port of a PC to an external signal generator to keep synchronization. Although this solution may take advantage of distributing parallel processing power, and GPU scalability, memory, and special hardware card may not be a problem, this solution still needs to hardwire a cable between a parallel port's interrupt line and the external signal generator for display timing. This solution may be difficult to scale an array of panels because of additional hardwired connection requirements, and current display panel design may not have any parallel port or exposed interrupt line.

Techniques of the present disclosure may address the genlock issue discussed above using a process without the hardwired synchronization signal and may be simpler and less expensive.

SUMMARY

The techniques of this disclosure may be generally related to using a genlock for displaying video output on multiple display panels. The techniques of this disclosure may be generally related to synchronizing timing of video data.

In one embodiment, an apparatus for displaying video data comprises a display configured to display video data based in part on a synchronization output, and a processor coupled to the display, the processor configured to obtain a measured vertical synchronization (VSYNC) value and a reference VSYNC value, at least one of the reference VSYNC value and the measured VSYNC value being based on a network time source, generate a synchronization output based in part on a comparison value from comparing a reference VSYNC value with the measured VSYNC value, and adjust timing of the video data based on the synchronization output.

In another embodiment, a method of displaying video data comprises obtaining a measured vertical synchronization (VSYNC) value and a reference VSYNC value, at least one of the reference VSYNC value and the measured VSYNC value being based on a network time source, generating a synchronization output based in part on a comparison value from comparing a reference VSYNC value with the measured VSYNC value, adjusting timing of the video data based on the synchronization output, and displaying video data based in part on the synchronization output.

In another embodiment, a non-transitory computer-readable medium stores instructions that, when executed, cause at least one physical computer processor to perform a method of displaying video data. The method comprises obtaining a measured vertical synchronization (VSYNC) value and a reference VSYNC value, at least one of the reference VSYNC value and the measured VSYNC value being based on a network time source, generating a synchronization output based in part on a comparison value from comparing a reference VSYNC value with the measured VSYNC value, adjusting timing of the video data based on the synchronization output, and displaying video data based in part on the synchronization output.

In yet another embodiment, an apparatus for displaying video data comprises a means for displaying video data based in part on a synchronization output, a means for obtaining a measured vertical synchronization (VSYNC) value and a reference VSYNC value, at least one of the reference VSYNC value and the measured VSYNC value being based on a network time source, a means for generating a synchronization adjustment value based in part on a comparison value from comparing a reference VSYNC value with the measured VSYNC value, and a means for adjusting timing of the video data based on the synchronization adjustment value.

BRIEF DESCRIPTION OF DRAWINGS

The disclosed aspects will hereinafter be described in conjunction with the appended drawings and appendices, provided to illustrate and not to limit the disclosed aspects, wherein like designations denote like elements.

FIG. 1B is a diagram illustrating the array of display panels in FIG. 1A with listings of exemplary components of each panel in accordance with one embodiment.

FIG. 2 illustrates a frame synchronization example for graphic rendering on tiled display panels.

DETAILED DESCRIPTION

Innovations described and illustrated in this disclosure may provide scalable solutions to synchronize refreshing an image on multiple display panels that are being used in a close proximity to display related images, for example, each display displaying a portion of information or an image displayed as by the multiple display panels. Having a synchronized refresh rate for displaying video output on the multiple display panels presents a seamless (or nearly so) corresponding refresh of the display panels as a whole to a viewer. When displays or video instruments are synchronized in this way, they are said to be generator locked, or "genlocked." As used to herein, "genlock" is a broad term that refers to a technique where the video output of one source, or a specific reference signal, is used to synchronize multiple displaying panels.

Techniques of the present disclosure may derive the same display VSYNC timing for each display panel in an array of display panels from a global cluster clock. The global cluster clock may be based on a network time source, such as Network Time Protocol (NTP), Global Positioning System Pulse-Per-Second (GPS-PPS) signal, or Precision Time Protocol (PTP).

Reference refresh frequency and/or time may be predetermined, and based on the predetermined references and the global cluster clock, refresh frequency and/or time for each panel may be determined. For example, the target refresh frequency of 60 Hz may be the predetermined reference frequency. In this example, the techniques of this disclosure may measure the average refresh frequency of a display panel and compare the average frequency against the target refresh frequency. By adjusting display properties, the techniques of this disclosure may adjust the measured refresh frequency to be at or near the target refresh frequency for a display panel. In another example, an initial reference time may start at a predetermined point in time, e.g., Jan. 1, 1970 at 00:00:00.000. From the initial reference time, a current reference time may be derived by adding multiples of a predetermined refresh period that corresponds to a predetermined target frequency of 60 Hz, for example. The techniques of this disclosure may measure the difference between the refresh time of a display panel and compare the measured refresh time against the derived reference refresh time. By adjusting display properties, the techniques of this disclosure may adjust the measured refresh time to be at or near the derived reference refresh time for a display panel.

Therefore, the techniques of the present disclosure may not require direct communication of the common display VSYNC timing and may be flexible and scalable without dedicated genlock hardware or a common master synchronization signal hardwired to each display panel.

Figure 1A:
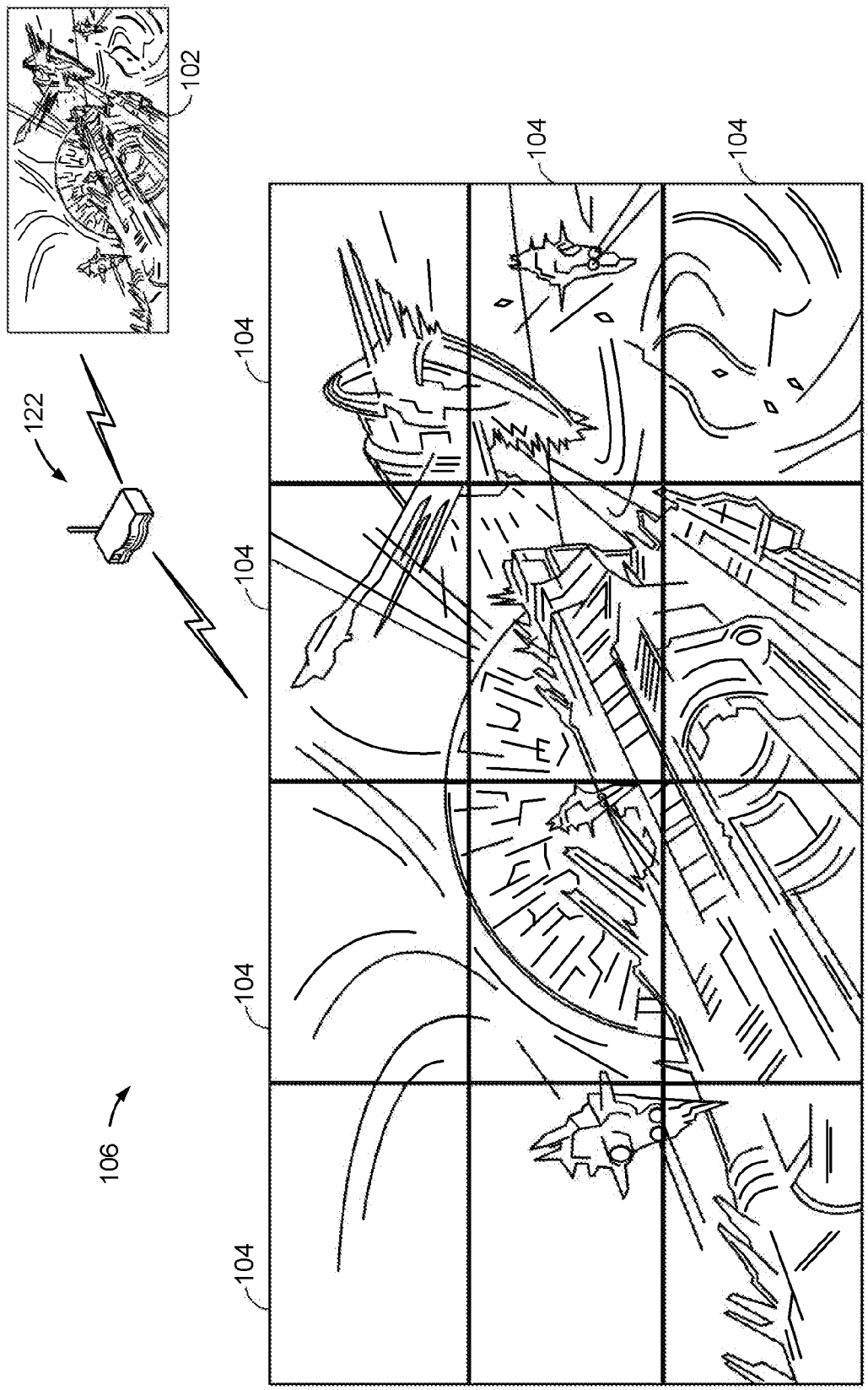
FIG. 1A is an example illustration of a video frame data sent through an access point to an array of display panels for tiled display in accordance with one embodiment.

FIG. 1A illustrates an example embodiment of a system that is configured to send data for a video frame 102 through an access point 122 to an array 106 of twelve display (or smart) panels 104 for a distributed or tiled display. Each display panel 104 is configured to display a portion of the video frame 102 synchronously to present the video frame 102 on multiple display panels 104. Several specific components that may be contained in or attached to display panels 104 will be discussed further below in connection with FIG. 1B.

FIG. 1B is a diagram illustrating the array 106 of display panels 104 in FIG. 1A with listings of exemplary components of each display panel in accordance with one embodiment. In Some embodiments, each display panel 104 may be a self-contained unit that may include a display screen 108 typically comprising a plurality of pixels, a graphics processing unit (GPU) 110, a video processing unit (VPU) 112, a central processing unit (CPU) 114, communication interface 116, and a user interface 118 (for example, a touch panel or buttons). In one embodiment, the array 106 of display panels 104 can be organized into a higher resolution display such as video display wall, or a virtual environment such as cave automatic virtual environment (CAVE). One advantage may be the distribution of graphic rendering and video processing to the hardware accelerators within each display panel 104. In one embodiment, the tiled display panels 104 may be multiple mobile devices. Techniques of the present disclosure may provide a lightweight optimized platform that supports remote rendering of, for example, OpenGL, OpenGL ES1.0/1.1/2.0/3.0/3.1 commands, frame synchronization of the multiple mobile display devices, and touch interface emulation.

Following the client-server architecture of, for example, OpenGL, OpenGL ES1.0/1.1/2.0/3.0/3.1, client commands may be serialized and sent to each display elements for rendering. Commands may be sent to all displays or may also be filtered and sent to each display specifically using various parallel rendering techniques such as sort-first and sort-last. Each display element may be given a viewport corresponding to its location and size in a virtual display array. Viewport configuration can be dynamically updated to reflect new usage scenario. Each display panel 104 may report touch events to an aggregator component residing in the client. The aggregator may be configured to translate events coming from the multiple display panels 104 into coherent multi-touch events emulating one virtual touch panel which is easier for a user to control.

Figure 1C:
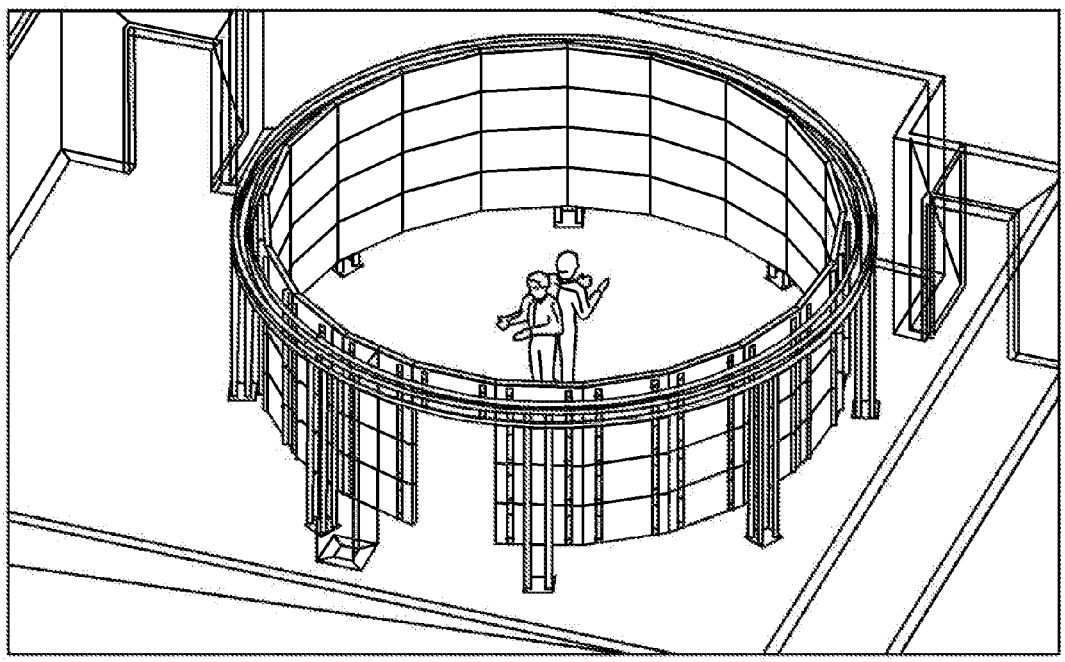
FIG. 1C is a diagram illustrating an example implementation of displaying video output on multiple display panels in accordance with one embodiment.

FIG. 1C is a diagram illustrating an example implementation of displaying video output on multiple display panels in accordance with one embodiment. The multiple display panels may be substantially similar to the array of display panels 104 of FIGS. 1A and 1B. As illustrated, the multiple display panels may be set up in a circular configuration to provide a 360 degree surrounding display for viewers that are positioned within the circular configuration of the smart panels.

FIG. 2 illustrates a frame synchronization example for graphic rendering on tiled display panels. Example frame synchronization may use synchronized swapping of frame buffer on all the display panels 104 (FIGS. 1A and 1B) simultaneously. To achieve frame synchronization, all of the display panels should have common refresh timing (e.g., a common genlock signal), and all of the display panels should perform a buffer swap at the same time. Certain aspects of achieving synchronous refreshing of the display panels is described by the exemplary techniques described further in connection with FIGS. 4-10 below.

Still referring to FIG. 2, exemplary timing for VSYNC signals of two exemplary panels, Panel n and Panel n+1, and first and second Panel n VSYNC signals 201 and 202 are shown. In this example, Panel n VSYNC signals 204 and Panel n+1 VSYNC signals 206 are off by a VSYNC delta 203 at the time of rendering, and applied VSYNC signals 208 are based on the Panel n VSYNC signals 204. Once a draw signal 210 is issued, the tiled display panels (e.g., Panel n and Panel n+1) may initiate the process of rendering and frame buffer swapping to display a frame associated with the draw signal 210. In this example, Panel n may start rendering its display data after the first Panel n VSYNC signal 201 immediately following the draw signal 210. The second panel in this example, Panel n+1, may start its rendering process after its VSYNC signal immediately following the draw signal 210, which is off sync with the Panel n VSYNC signal (and thus, the applied VSYNC signal) by the VSYNC delta 203 at the moment. A finish signal 212 may be issued as Panel n's rendering is finished, at which point Panel n+1's rendering is still on-going. A swap barrier 216 may be created after the finish signal 212 is issued and while Panel n+1's rendering is on-going thus preventing Panel n from swapping is frame buffers as it would normally do in a single display setting. As Panel n+1 finishes rendering and enters a buffer swap mode (e.g., ready to swap), the swap barrier 216 may end, and a swap buffer signal 214 may be issued since all the panels (e.g., Panel n and Panel n+1) are ready to swap. A period 218 between the swap buffer signal 214 and the second Panel n VSYNC signal 202, which immediately follows the swap buffer signal 214 is the period in which it is safe to swap frame buffers for all the panels (e.g., Panel n and Panel n+1). Therefore, after the second Panel n VSYNC signal 202 is issued, no swap may occur even though a display panel (e.g., Panel n+1) is in its swap mode as noted in a no swapping period 220. For additional display panels to the tiled display panels of FIG. 2, a maximum rendering time 222 can be determined as follows:

(Maximum available rendering time)=((number of swap buffers)−1)×(frame time)−2×(maximum VSYNC delta)

where frame time is the display refresh period.

In the example illustrated in FIG. 2, all nodes may be synchronized to a network time source such as Network Time Protocol (NTP), Global Positioning System Pulse-Per-Second (GPS-PPS) signal, or Precision Time Protocol (PTP). Panel n and Panel n+1, for example, may be running at different (yet compatible) refresh rates while being synchronous with the network time source as discussed in connection with FIG. 3 below.

Figure 3:
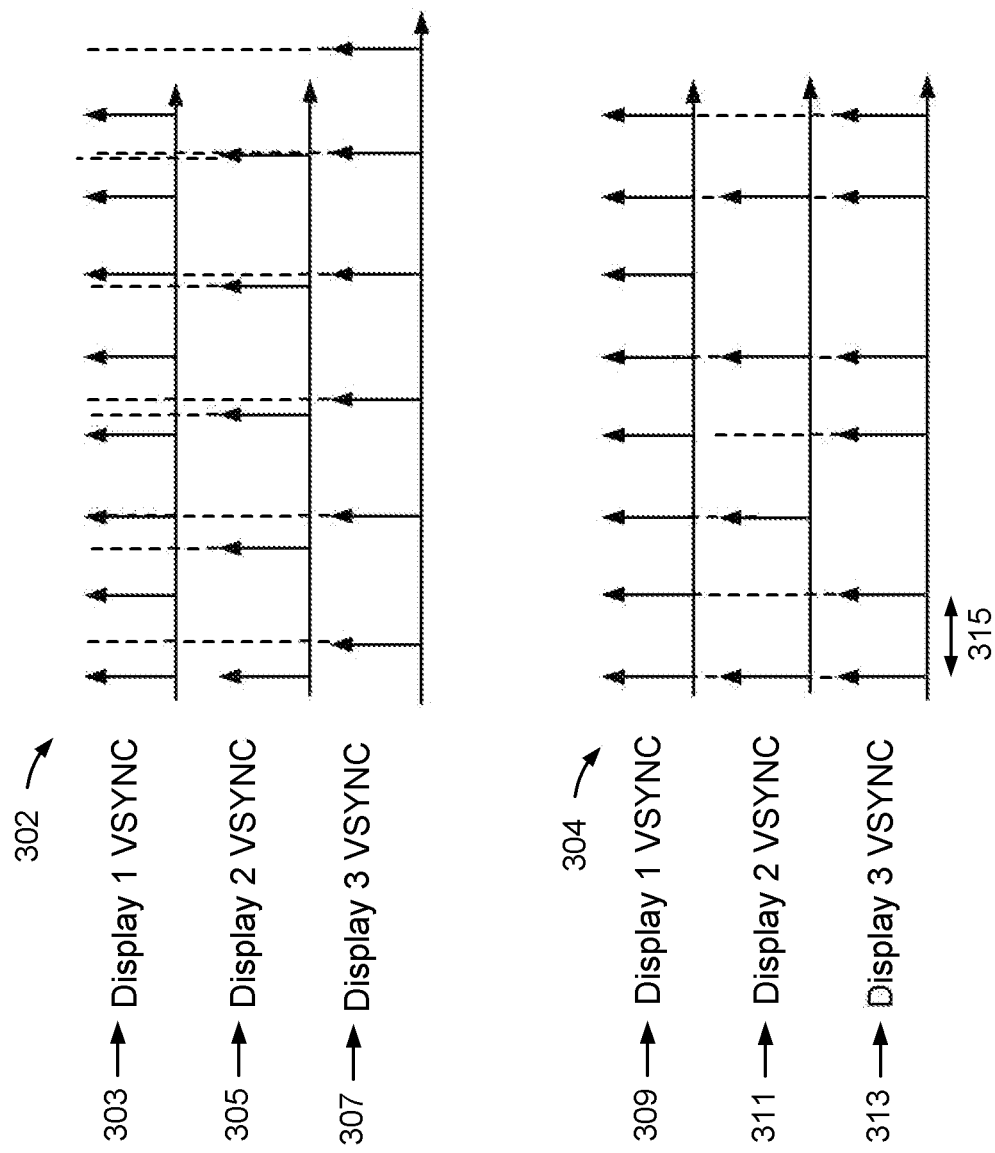
FIG. 3 illustrates timing diagrams for an exemplary refresh rate scaling.

FIG. 3 illustrates examples of timing diagrams that provide examples of refresh rate scaling. To minimize the amount of power consumed by a display panel, some display panels may be configured to lower refresh rates based on the content that they are displaying. In embodiments where multiple display panels are grouped together to display a large image, lowering the refresh rate of a display panel can lead to a visible condition known as "tearing," which is a visual artifact of one portion of an image frame displayed on one panel noticeably appearing slightly earlier or later than another portion of the same image frame displayed on another panel. In other words, if an individual display within the group of display panels is allowed to adjust freely (for example, adjust its refresh rate individually based only on its displayed content), the overall picture displayed by the group of display panels may exhibit tearing due refreshes occurring out of phase.

Timing diagram 302 illustrates an example of the refresh rate of multiple displays being out of sync. Specifically, the timing diagram 302 illustrates the refresh rates for three different displays, Display 1, Display 2, and Display 3. The refresh rate of each of the displays is indicated by the vertical synchronization signals for each the three displays: Display 1 VSYNC signals 303, Display 2 VSYNC signals 305, and Display 3 VSYNC signals 307. Each of the VSYNC signals 303, 305 and 307 may be adjusted independently without reference to the other VSYNC signals 303, 305 and 307. That is, each of Displays 1-3 can adjust its refresh rate independent of the other Displays 1-3 depending on its own content and/or its power consumption. In such a configuration, the VSYNC signals 303, 305, and 307 may not ever all be aligned, or two may sometimes be aligned, or they all may be aligned in some situations but such an alignment would occur randomly and may not last for very long. Accordingly, the multiple displays Display 1, Display 2, and Display 3 may have refresh rates that are not aligned and the three displays do not refresh a displayed image at the same time, or even at a time when the other displays are refreshing their displayed image.

Timing diagram 304 illustrates an example of the refresh rate of multiple displays being in-sync, in accordance with some embodiments. Specifically, the timing diagram 304 illustrates the Display 1 VSYNC signals 309, Display 2 VSYNC signals 311, and Display VSYNC signals 313 that may be aligned or "in-sync" in various ways. In one embodiment, adjustment of the refresh rate of each of Displays 1-3 is restricted so that each refresh period is an integer multiple of a predetermined refresh period denomination 315 with each refresh signal restricted to the same phase. For example, in the timing diagram 304, the Display 1 VSYNC signals 309 have the highest refresh rate with the common, shortest refresh period denomination 315. On the other hand, the refresh rate of the Display 2 VSYNC 311 is half of that of the Display 1 VSYNC 309, and the refresh rate of the Display 3 VSYNC 313 is 2/3 (on average) of that of the Display 1 VSYNC 309. Instead of having Display 1, Display 2, and Display 3 to have their refresh rates independently adjusted, the Display 1-3 VSYNCs 309, 311, and 313 are restricted to a subset of the points at which there would be a VSYNC signal that has the shortest refresh period, e.g., the refresh period denomination 315. The Display 1 VSYNC 309, in this example, happens to have its refresh period as the refresh period denomination 315. Any added display to this group may have its VSYNC period as an integer multiples of the refresh period denomination 315 so that it is compatible with other displays which also have their VSYNC periods as an integer multiples of the refresh period denomination 315 with the same phase. This compatibility allows each display to lower its refresh rate, either periodic (e.g., Display 1 and Display 2) or aperiodic (e.g., Display 3), to save power while preventing an occurrence of tearing.

Figure 4:
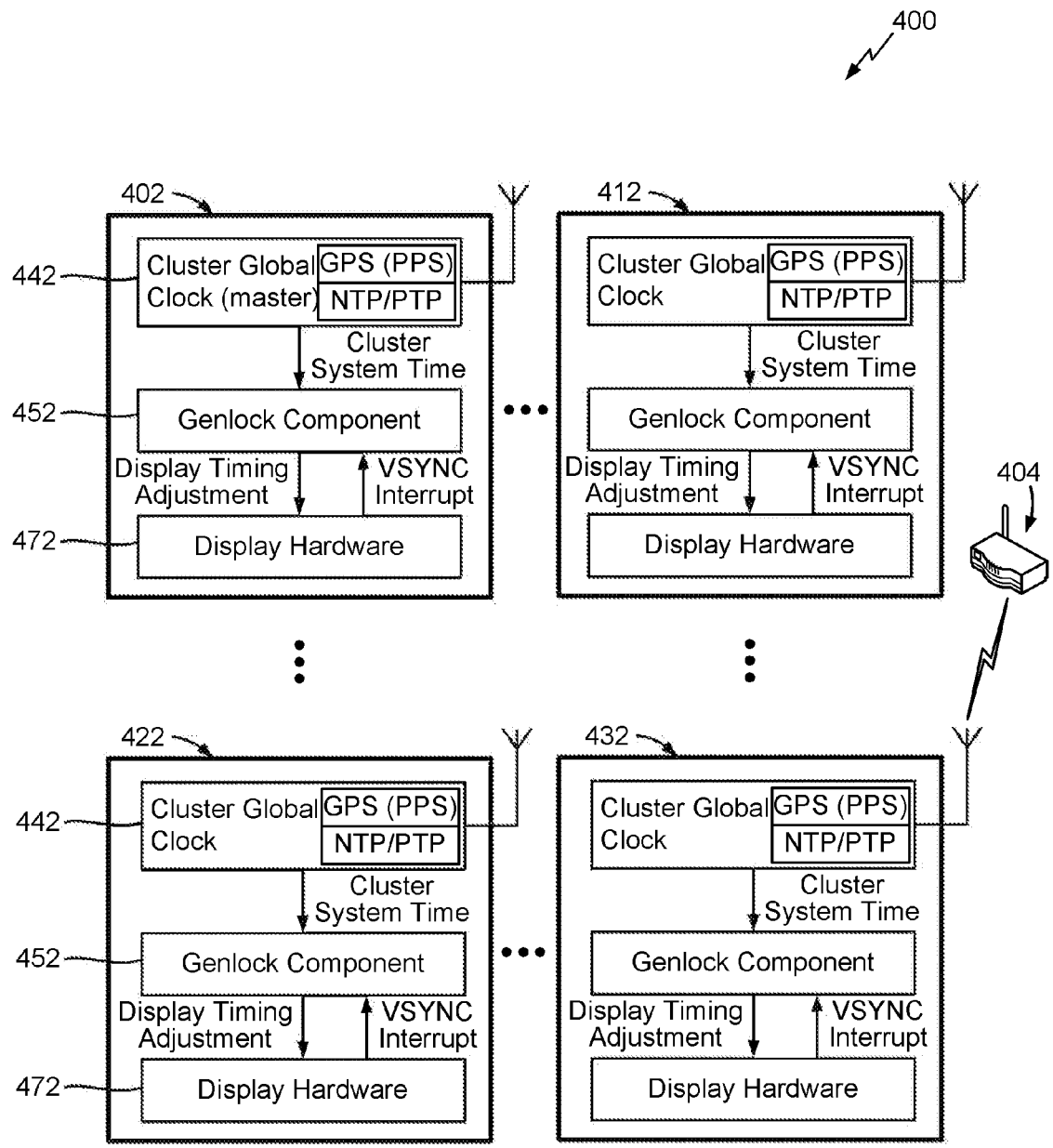
FIG. 4 is a diagram illustrating an array of display panels implementing a genlock in accordance with an example implementation of this disclosure.

FIG. 4 is a diagram illustrating an array 400 of display panels 402, 412, 422, and 432 implementing a genlock in accordance with an example implementation of this disclosure. The display panels 402, 412, 422, and 432 are depicted as an illustrative sample of an array of display panels that may include any number of panels in different implementations. The display panels 402, 412, 422, and 432 may be used as display panels 104 illustrated in FIGS. 1A and 1B. As shown in the display panel 402, each display panel may include a cluster global clock 442, a genlock component 452, and display hardware 472. In one embodiment, one of the cluster global clocks 442 of one of the display panels 402, 412, 422, 432 may function as a master clock, to which other cluster global clocks 442, functioning as slave clocks, may synchronize. In another embodiment, all the cluster global clocks 442 may receive the same network time signal and synchronize to the network time signal rather than a master clock signal. An access point 404 may in some examples be a router or other access point module that may receive data (e.g., a network time signal) from a source (e.g., a master clock in the display panel 402 using, for example, NTP, GPS-PPS signal, or PTP) and transmit the data to each of the display panels 402, 412, 422, and 432.

A network time source for the array 400 of the display panels 402, 412, 422, and 432 may be based on NTP, GPS-PPS signal, or PTP, in some examples. NTP may achieve accuracy in the order of one millisecond at update intervals of one minute, in some examples. A GPS receiver may give a PPS signal, together with operating system support (e.g., in some Unix operating system kernels or other *nix/Unix-style operating system kernels), the accuracy may be in the order of a few microseconds, in some examples. PTP may also be used in IEEE 802.1 Audio/Video Bridging for precise synchronization, in some examples. The accuracy expectations of the PTP synchronized clocks may be in the order of 100 nanoseconds, in some examples.

In some example implementations, first, all the display panels 402, 412, 422, and 432 may be synchronized to the same global cluster time, using NTP, GPS-PPS signal, or PTP. For NTP and PTP, one device in the network may be chosen as the master (e.g., the panel 402 in the array 400 of FIG. 4). All the other panels 412, 422, and 432 may follow the master clock through the closed network among these devices using these protocols. PTP has a mechanism to select the optimal master clock source among the display panels. For example, PTP may use Best Master Clock (BMC) algorithm as specified in IEEE 1588 to select the optimal master source among the display panels. For GPS-PPS signal, the GPS satellite clock may serve as the master clock and all display panels may follow the satellite clock. Therefore, various example systems may work within a closed network system, including without access to the Internet.

The cluster global clock 442 may be based on NTP, GPS-PPS signal, or PTP, for example. Based on the cluster global clock 442, each of the display panels 402, 412, 422, and 432 unit may individually run the genlock mechanism (e.g., with the genlock component 452), which may provide local VSYNC adjustment continuously (e.g., to the display hardware 472 in each respective display panel). Techniques of the present disclosure may thus use network time servers, for example, NTP, GPS (e.g., GPS PPS), or PTP, to generate reference VSYNC (e.g., reference Vertical Synchronization) without the use of a hardwired genlock signal. As shown in the diagram of the display panel 422, the cluster global clock 442 may output a cluster system time (e.g., network time, master clock time, global cluster clock time) to the genlock component 452, and the genlock component 452 may output display timing adjustment to the display hardware 472. The display hardware 472 in turn may output a VSYNC interrupt to the genlock component 452.

Figure 5:
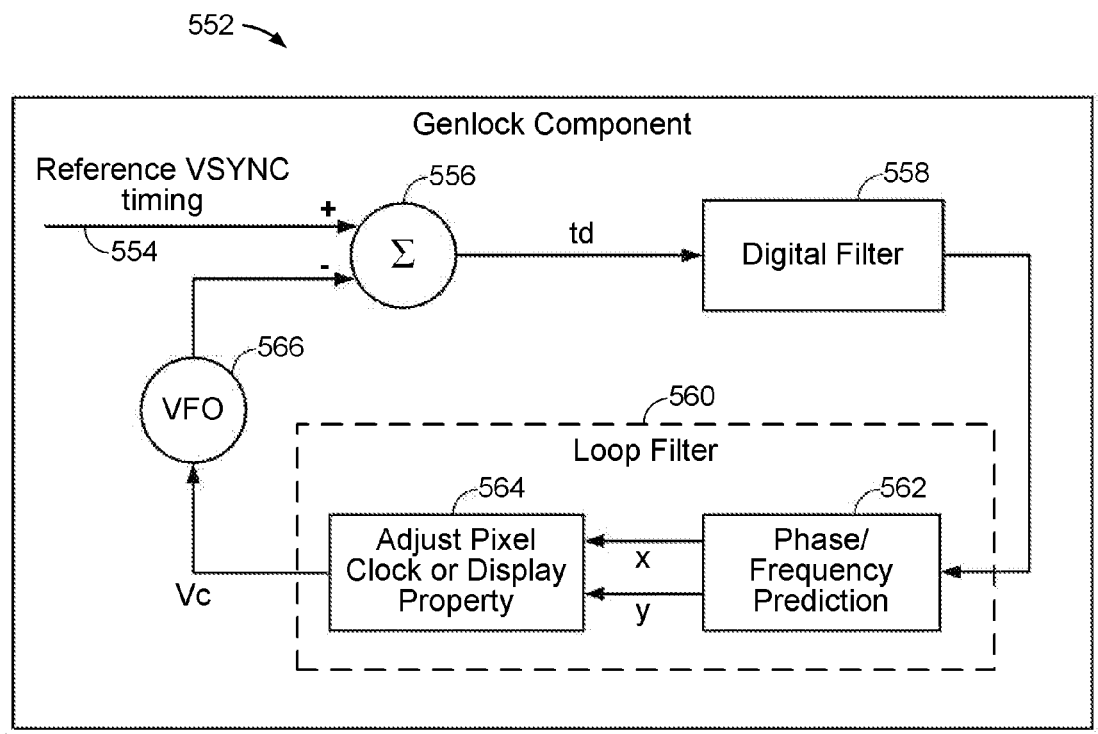
FIG. 5 is a diagram illustrating an implementation of a genlock according to one embodiment.

FIG. 5 shows a diagram of an example of a genlock component 552 that may be used as a genlock component 452 of the display panel 402 as illustrated in FIG. 4. As shown in the example of FIG. 5, the genlock component 552 may receive a reference VSYNC timing input 554 from a clock such as the cluster global clock 442 as illustrated in FIG. 4. A summer 556 receives the reference VSYNC timing input 554 and an output from the variable frequency oscillator (VFO) 566. The output from the summer 556 may be filtered by a digital filter 558 and a loop filter 560. The VFO may receive the output from the loop filter 560, and the output from the VFO 566 may be compared with the reference VSYNC timing input 554 at the summer 556. As also shown in FIG. 5, the loop filter 560 may include a phase/frequency prediction unit 562 and a pixel clock/display property adjustment unit 564. In some embodiments, the output of the VFO 566 may be provided as a display timing adjustment output from the genlock component 552 to the display hardware 472 (FIG. 4). The genlock component 552 may therefore generate a comparison of a reference synchronization value with a measured synchronization value (e.g., the output of the summer 556 serving as a comparison of the reference VSYNC timing input 554 and a measured VSYNC value output from the VFO 566) and adjust a synchronization output based on the comparison of the reference synchronization value with the measured synchronization value. In one embodiment, the genlock component 552 may generate an output from the loop filter 560, and in particular from the pixel clock/display property adjustment unit 564, for adjusting a synchronization output based on the comparison of the reference synchronization value with the measured synchronization value. Any one or more parts of the genlock component 552 as depicted in FIG. 5 may be implemented in whole or in part in any type of software, firmware, processing units or other hardware, as further described below.

In some implementations, the reference VSYNC timing input 554 may be derived. Having the same global cluster time, each display panel in the array 400 (FIG. 4) may derive the same reference VSYNC timing input 554 from the predetermined first VSYNC time and a constant VSYNC interval. For example, if all the display properties are set to 60 Hz or 60 fps, a constant VSYNC interval may be defined of 1/60 second ≈16.667 milliseconds. In one example, Jan. 1, 1970, 00:00:00.000 may be the common initial reference time for the first VSYNC, and then a common VSYNC reference timing and behavior may be projected with 16.667 millisecond intervals at any moment of the current time after the common initial reference time. If the frequency and phase of every VSYNC aligns with the common VSYNC reference timing, all the display panels 402, 412, 422, and 432 (FIG. 4) may then have genlock synchronization without the need of dedicated hardware to communicate the master genlock signal.

Figure 6:
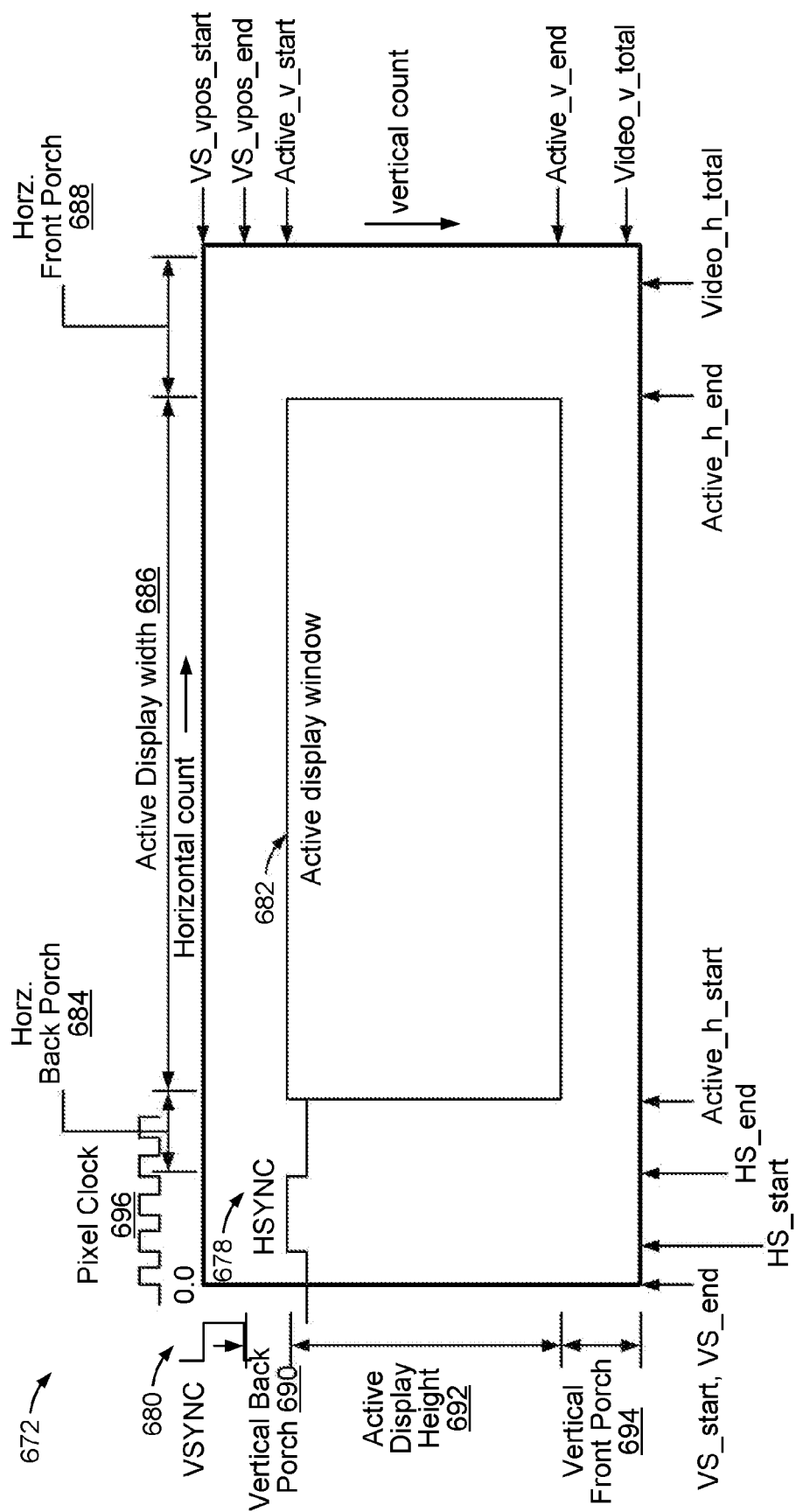
FIG. 6 is shows a display regional and timing diagram of a display hardware of a display panel according to one embodiment.

FIG. 6 shows an example of a display regional and timing diagram of display hardware 672 that may be substantially similar to the timing scheme used by the display hardware 472 of the display panel 422 as shown in FIG. 4. FIG. 6 illustrates the directions of horizontal count and vertical count, a horizontal synchronization (HSYNC) signal 678, and a vertical synchronization (VSYNC) signal 680, and an active display window 682. Techniques of the present disclosure may use software phase lock loop to synchronize the display panels 402, 412, 422, and 432 (FIG. 4) to the reference VSYNC by, for example, adjusting the vertical front porch as further described below. Techniques of the present disclosure may keep the display panels 402, 412, 422, and 432 (FIG. 4) in sync without continuous communication of individual VSYNC signals to the display panels. Techniques of the present disclosure may be low cost and scalable to a large array of display panels, among other advantages.

Display serial interface (DSI) Timing in accordance with techniques of this disclosure is as follows:

$$HSYNC\_Period = HSYNC\_Pulse\_Width + Horz\_Back\_Porch + Active\_Display\_Width + Horz\_Front\_Porch$$

$$VSYNC\_Period = (VSYNC\_Pulse\_Width + Vert\_Back\_Porch + Active\_Display\_Height + Vert\_Front\_Porch) \times HSYNC\_Period$$

where HSYNC_Period is a HSYNC_period, HSYNC_Pulse_Width is a pulse width of the HSYNC signal 678, Horz_Back_Porch is a horizontal back porch period 684, Active_Display_Width 686 is a horizontal display period of the active display window 682, and Horz_Front_Porch is a horizontal front porch period 688. Also, VSYNC_Period is a VSYNC period, VSYNC_Pulse_Width is a pulse width of the VSYNC signal 680, Vert_Back_Porch is a vertical back porch period 690, Active_Display_Height 692 is a vertical display period of the active display window 682, and Vert_Front_Porch is a vertical front porch period 694.

In one embodiment, either changing the pixel clock width or changing a display property in non-displaying regions (e.g., outside the active display window 682) can change display refresh rate without affecting display resolution. For example, increasing the vertical front porch period 694, the vertical back porch period 690, the horizontal front porch period 688, or the horizontal back porch period 684 means a slower refresh rate, and reducing at least one of the porch periods 694, 690, 688, and 684 means a higher refresh rate. In another example, faster pixel clock means a higher refresh rate. Therefore, display VSYNC timing adjustment (without affecting the active display window) can be done by changing the pixel clock by adjusting the PLL (phase-locked loop) or by changing the non-display region property, such as vertical or horizontal front or back porches 694, 690, 688, or 684. The display hardware 672 may scan each pixel-dot horizontally from left to right and then repeat vertically from top to bottom with the pixel clock. The VSYNC refresh timing adjustment can be based on the following:

$$Number\_Horizontal\_Dot = HSYNC\_Pulse\_Width + Horiz\_Back\_Porch + Active\_Display\_Width + Horiz\_Front\_Porch$$

$$Total\_Number\_Frame\_Dot = (VSYNC\_Pulse\_Width + Vert\_Back\_Porch + Active\_Display\_Height + Vert\_Front\_Porch) \times Number\_Horizontal\_Dot$$

$$Time\_to\_Refresh\_a\_Frame = Pixel\_Clock\_Cycle\_Time \times Total\_Number\_Frame\_Dot$$

where Number_Horizontal_Dot is a number of horizontal pixels, Total_Number_Frame_Dot is a number of frame pixels, Time_to_Refresh_a_Frame is a refresh period of a frame, and Pixel_Clock_Cycle_Time is a period of a pixel clock 696.

Figure 7:
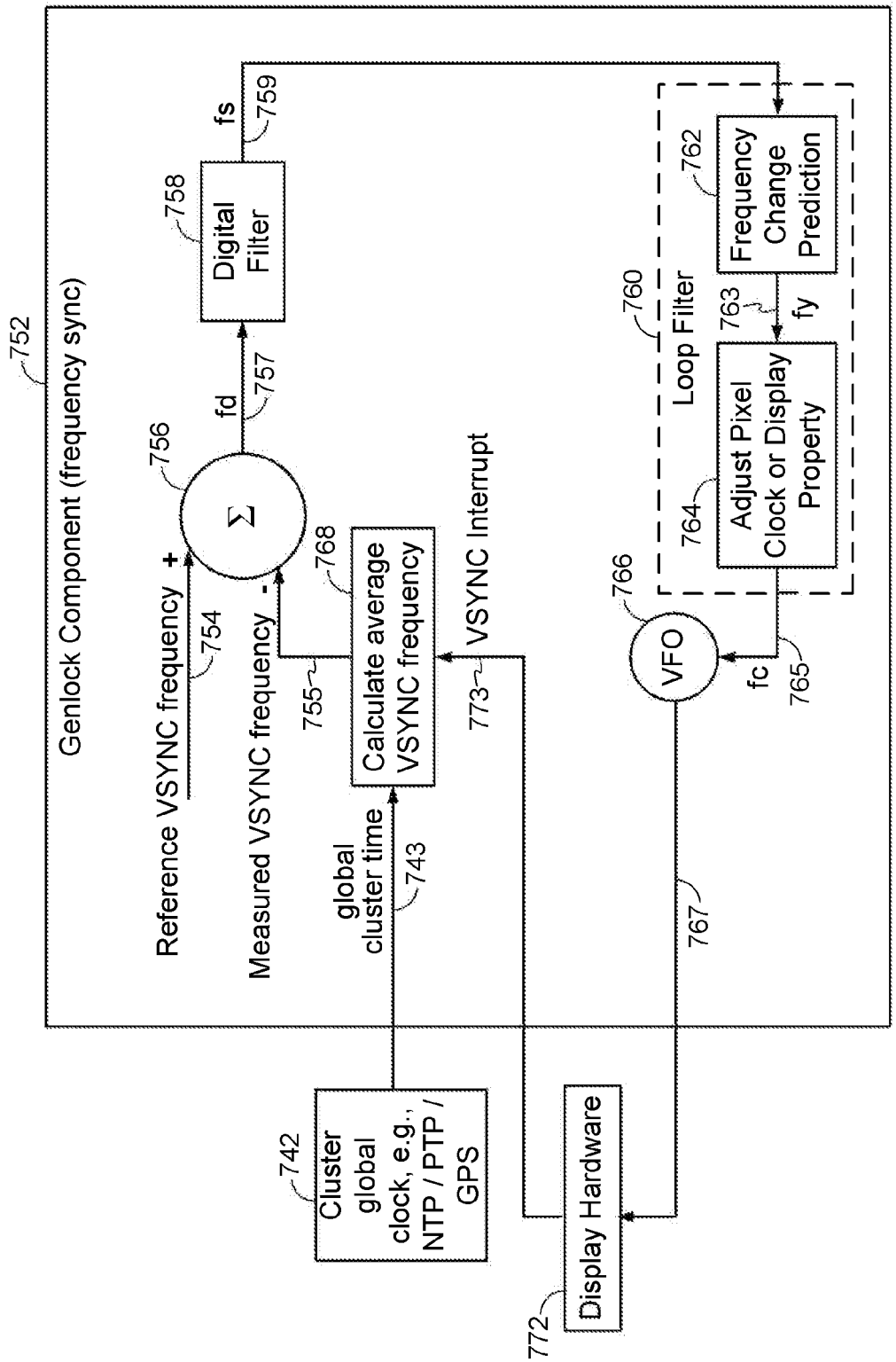
FIG. 7 shows another example diagram of a genlock and associated elements that may be used for synchronizing a VSYNC frequency in accordance with techniques of this disclosure.

FIG. 7 shows a diagram of an example of a genlock component 752 and associated elements that may be used for synchronizing a VSYNC frequency in accordance with techniques of this disclosure. In one embodiment, the techniques of this disclosure may be implemented to sync the frequency of an array of panels. First, a common refresh rate may be set for all the display panels (e.g., smart panels) in an array (e.g., the array 400 of display panels as shown in FIG. 4)—for example, 60 Hz, which may be the reference VSYNC frequency. Next, a measured VSYNC frequency may be obtained at the VSYNC interrupt and locked against the reference VSYNC frequency with a frequency loop lock mechanism as shown in FIG. 7 to an accuracy of, e.g., 0.1% (59.94-60.06 Hz).

As shown in FIG. 7, a genlock component 752 may receive a reference VSYNC frequency input 754 from a clock such as the cluster global clock 442 as illustrated in FIG. 4. The reference VSYNC frequency input 754 is compared with a measured VSYNC frequency input 755 at a summer 756. A summer output 757 is filtered by a digital filter 758. A loop filter 760 may receive a digital filter output 759 and output a loop filter output 765 may be fed to a variable frequency oscillator (VFO) 766. A VFO output 767 may be connected to display hardware 772, which may not be part of the genlock component 752. A cluster global clock 742, which may not be part of the genlock component 752, may provide a global cluster time 743 to an average VSYNC frequency calculation unit 768. The average VSYNC frequency calculation unit 768 may receive a VSYNC interrupt signal 773 and output the measured VSYNC frequency 755. The loop filter 760 may include a frequency change prediction unit 762 and a pixel clock or display property adjustment unit 764.

As also shown in FIG. 7, the summer 756 may receive the reference VSYNC frequency input 754 and the measured VSYNC frequency input 755, which is generated as an output 755 from the average VSYNC frequency calculation unit 768. The summer 756 may generate the summer output 757, also labeled as "fd" in FIG. 7. The summer output 757 or "fd" may be a difference between the measured VSYNC frequency input 755 and the reference VSYNC frequency input 754. The digital filter 758 may receive the summer output 757 or "fd" and generate the digital filter output 759 or "fs," also labeled as "fs" in FIG. 7. The digital filter output 759 or "fs" may be a output filtered to smooth out noise. The loop filter 760 may receive the digital filter output 759 or "fs." The frequency change prediction unit 762 of the loop filter 760 may generate a prediction unit output 763, also labeled as "fy" in FIG. 7. The prediction unit output 763 or "fy" may be a computed frequency adjustment from a prediction function. The pixel clock or display property adjustment unit 764 may receive the prediction unit output 763 or "fy" and generate the loop filter output 765, also labeled as "fc" in FIG. 7. The loop filter output 765 or "fc" may be an input to adjust the VFO 766 for the VSYNC timing at a determined VSYNC interval (e.g., every second (1 Hz.)).

The VFO 766 may provide an output 767 from the genlock component 752 to the display hardware 772. The display hardware 772 may return the VSYNC interrupt signal 773 to the genlock component 752, and in particular, to the average VSYNC frequency calculation unit 768, which may also receive the global cluster time signal 743 from the cluster global clock 742, which may use, e.g., NTP, PTP, or GPS-PPS to output the global cluster time signal 743 (e.g., a master clock signal or network time signal). The average VSYNC frequency calculation unit 768 may then generate the measured VSYNC frequency input 755 to the summer 756, as described above. As with the genlock component 552 as shown in FIG. 5, any one or more portions of the genlock component 752 as shown in FIG. 7 may be implemented in whole or in part in any type of software, firmware, processing units, or other hardware.

The genlock component 752 may therefore generate a comparison value of a reference synchronization value with a measured synchronization value (e.g., the output of the summer 756 determining the comparison value of the reference VSYNC frequency input 754 and the measured VSYNC frequency input 755 outputted from the average VSYNC frequency calculation unit 768), and adjust a synchronization output based on the comparison of the reference synchronization value with the measured synchronization value. For example, the genlock component 752 may generate an output 765 from the loop filter 760, and in particular from the pixel clock or display property adjustment unit 764, for adjusting a synchronization output to the VFO 766 and the display hardware 772 based on the comparison value between the reference VSYNC frequency input 754 and the measured VSYNC frequency input 755.

In one embodiment, after achieving the desired display refresh rate within an acceptable accuracy (for example, +/−0.1%), the phase may be fine-tuned. This embodiment may involve fine-tuning the phase of a measured VSYNC time against a reference VSYNC time from the global cluster clock using a phase lock loop. An example of this embodiment is shown in FIG. 8.

Figure 8:
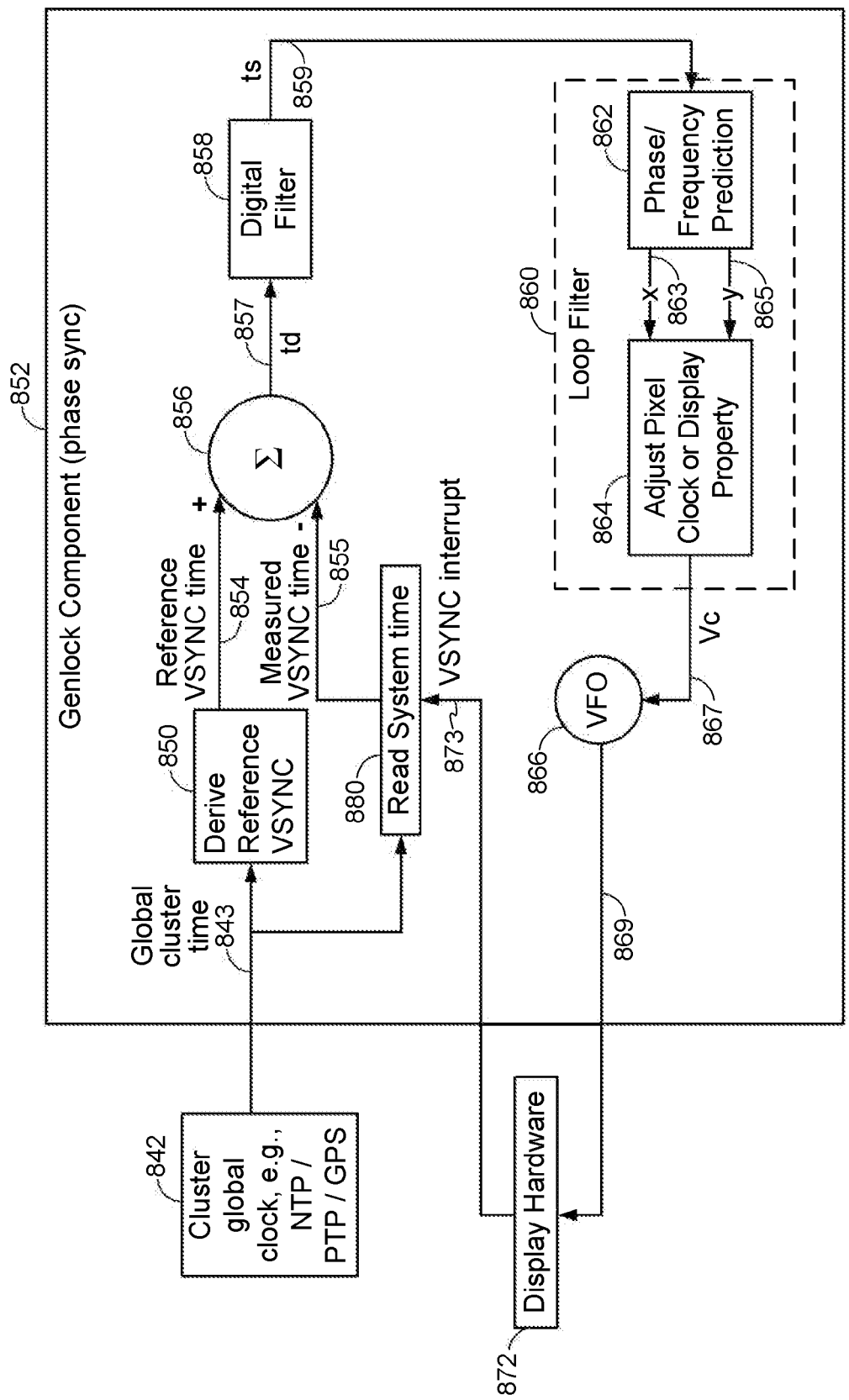
FIG. 8 shows an example diagram of a genlock and associated elements that may be used for synchronizing a VSYNC phase in accordance with techniques of this disclosure.

FIG. 8 shows a diagram of an example of a genlock component 852 and associated elements that may be used for synchronizing a VSYNC phase in accordance with one embodiment. Some elements and outputs of the genlock component 852 in the example of FIG. 8 may be the same as or analogous to the corresponding elements and outputs of the genlock component 752 in the example of FIG. 7 and may perform the same or analogous functions as the corresponding elements or outputs. These similar features may include a cluster global clock 842 and a global cluster time signal 843. Some elements and outputs are analogous in time as opposed to frequency in their counterparts in FIG. 7, as may be apparent from the description that follows.

As shown in FIG. 8, the genlock component 852 may include a reference VSYNC derivation unit 850, which generates a reference VSYNC time input 854 to a summer 856. The summer 856 may receive a measured VSYNC time input 855 and may compare the measured VSYNC time input 855 with the reference VSYNC time input 854. A summer output 857 is filtered by a digital filter 858, and a loop filter 860 may receive a digital filter output 859. A variable frequency oscillator (VFO) 866 may receive a loop filter output 867, and display hardware 872 may receive a VFO output 869 from the VFO 866. The display hardware 872 may not be part of the genlock component 852, and the cluster global clock 842, which may not be part of the genlock component 852, may generate a VSYNC interrupt signal 873. A system time read unit 880 may receive the VSYNC interrupt signal 873 and generate a measured VSYNC time output 855 based on the global cluster time output 843. As also shown in FIG. 8, the loop filter 860 may include a phase/frequency prediction unit 862 and a pixel clock or display property adjustment unit 864.

As also shown in FIG. 8, the summer 856 may receive the reference VSYNC time input 854, generated as an output from the reference VSYNC derivation unit 850, and the measured VSYNC time input 855, generated as an output from the system time read unit 880. The summer 856 may generate the summer output 857, also labeled as "td" in FIG. 8. The summer output 857 or "td" may be a difference between the measured VSYNC time input 855 from the system time read unit 880 and the reference VSYNC time input 854 from the reference VSYNC derivation unit 850. The digital filter 858 may receive the summer output 857 or "td" and generate a digital filter output 859, also labeled as "ts" in FIG. 8. The digital filter output 859 or "ts" may be a filtered output to smooth out noise in a difference in time. The loop filter 860 may receive the digital filter output 859 ("ts"). The phase/frequency prediction unit 862 of the loop filter 860 may generate phase and frequency outputs 863 and 865, also labeled as "x" and "y" respectively in FIG. 8. The phase output 863 or "x" may be a computed phase adjustment from a prediction function, and the frequency output 865 or "y" may be a computed frequency adjustment from a prediction function. The pixel clock or display property adjustment unit 864 may receive the phase and frequency outputs 863 ("x") and 865 ("y") and generate a loop filter output 867, also labeled as "Vc" in FIG. 8. The loop filter output 867 or "Vc" may be an input to adjust the VFO 866 to change the VSYNC timing.

The VFO 866 may provide the VFO output 869 from the genlock component 852 to the display hardware 872. The display hardware 872 may return the VSYNC interrupt signal 873 to the genlock component 852, and in particular, to the system time read unit 880, which may also receive the global cluster time signal 843 from the cluster global clock 842, which may use, e.g., NTP, PTP, or GPS-PPS to output the global cluster time signal 843 (e.g., a master clock signal or network time signal). The system time read unit 880 may then provide the measured VSYNC time input 855 to the summer 856, as described above. As with the genlock component 552 as shown in FIG. 5 and the genlock component 752 as shown in FIG. 7, any one or more portions of the genlock component 852 as shown in FIG. 8 may be implemented in whole or in part in any type of software, firmware, processing units, or other hardware.

The genlock component 852 may therefore generate a comparison value of a reference synchronization value with a measured synchronization value (e.g., the output of the summer 856 serving as a comparison value between the reference VSYNC time input 854 and the measured VSYNC time input 855 from the system time read unit 880) and adjust a synchronization output based on the comparison value of the reference synchronization value with the measured synchronization value. For example, the genlock component 852 may generate an output from the loop filter 860, and in particular from the pixel clock or display property adjustment unit 864, for adjusting a synchronization output to the VFO 866 and the display hardware 872 based on the comparison value between the reference VSYNC time input 854 and the measured VSYNC time input 855.

Further details of using a genlock component to sync both the phase (as in FIG. 8) and the frequency (as in FIG. 7) are described below with reference to FIGS. 9A-10 below.

Figure 9A:
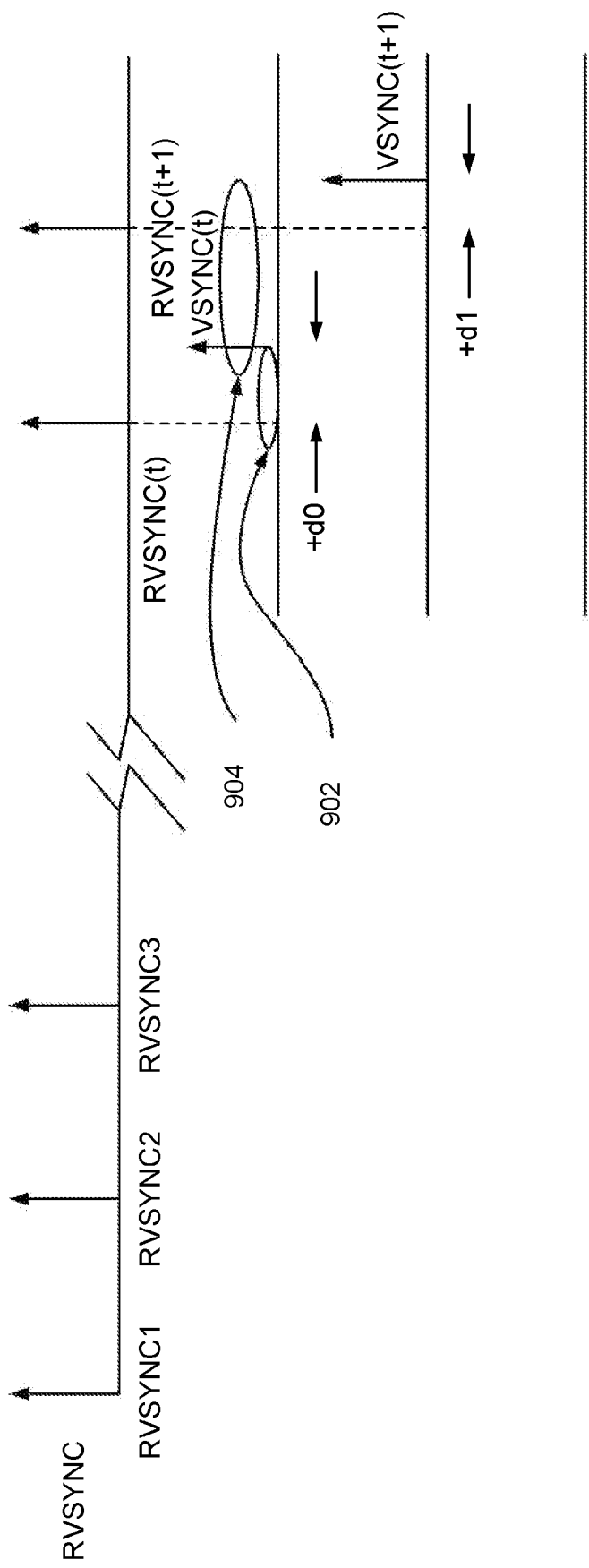
FIG. 9A shows a graph illustrating aspects of an example process for synchronizing a VSYNC phase and frequency in accordance with techniques of this disclosure.

FIG. 9A is a graph illustrating an example of aspects of a process for synchronizing VSYNC phase and frequency in accordance with techniques of this disclosure. Reference VYSNC (RVSYNC) timing may comprise a series of RVYSNC signals being apart from each other at a period of the global cluster time signal 743 or 843 as illustrated in FIG. 7 or 8 respectively. The RVSYNC signals may comprise an initial signal of RVSYNC1, and an RVSYNC signal at time t of display may be expressed as RVSYNC(t). RVSYNC1 in this illustration may start at Jan. 1, 1970 00:00:00.000, for example. In this example, during the display time, there are a first reference VSYNC of RVSYNC(t) with a small time difference 902 and a second reference VSYNC of RVSYNC (t+1) with a large time difference 904. RVSYNC(t) may be selected as a target for VSYNC(t) because of the small time difference 902, or "d0." Once the target RVSYNC is selected, the VSYNC timing of each panel VSYNC(t) may converge to the RVSYNC timing with a feedback and control mechanism according to the present disclosure.

Figure 9B:
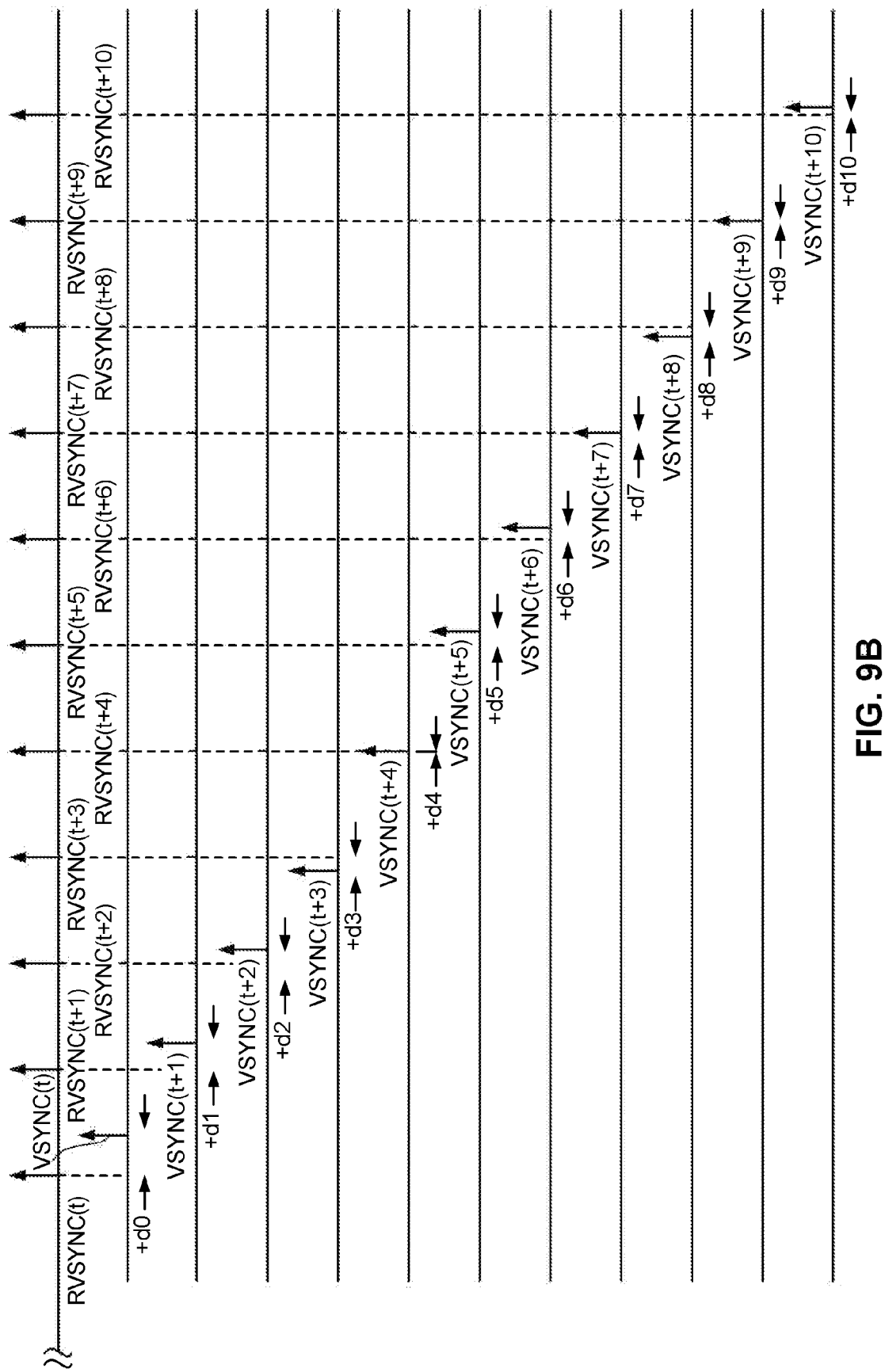
FIG. 9B shows another graph illustrating aspects of an example process for synchronizing a VSYNC phase and frequency in accordance with techniques of this disclosure.

FIG. 9B is another graph illustrating aspects of an example process for synchronizing a VSYNC phase and frequency in accordance with techniques of this disclosure. For VSYNC (t), the initial time difference is "d0," and FIG. 9B illustrates the difference between VSYNC and RVSYNC over time. For example at time t+1, the difference between VSYNC(t+1) and RVSYNC(t+1) is "d1," at time t+2, the difference between VSYNC(t+2) and RVSYNC(t+2) is "d2," and so on. Each successive row shows how VSYNC converges to RVSYNC over time.

A global cluster clock (e.g., 742 in FIGS. 7 and 842 in FIG. 8) may be accurate in the order of 1 millisecond for NTP and 100 nanosecond (or 0.0001 millisecond) for PTP in some examples. An assumption may be made of a worst case of 1 millisecond using NTP. The dynamic adjustment of the refresh cycle may be in the order of 20 microsecond considering a worst case of changing the horizontal or vertical front porch in the resolution of 768×1280. In case of changing a pixel clock dynamically, the change may be able to be achieved in the order of 1 microsecond in some examples. Therefore, with NTP and a phase loop lock to a common reference VSYNC timing, genlock synchronization according to the techniques of this disclosure may achieve synchronization accuracy with about 1 millisecond variance. With PTP or GPS-PPS, genlock synchronization according to the techniques of this disclosure may achieve synchronization accuracy within 0.0001 millisecond or 0.01 millisecond, respectively.

Figure 10:
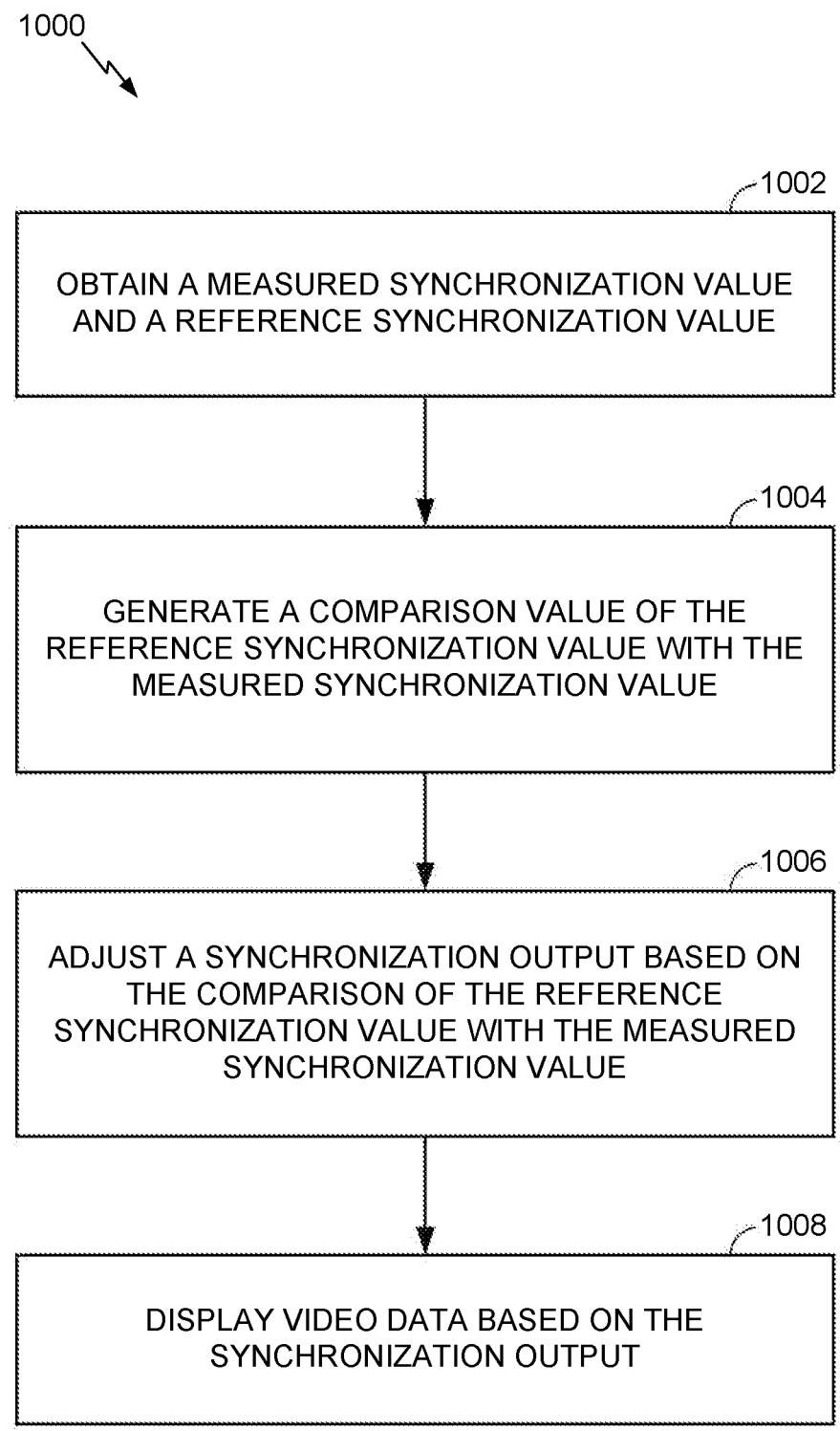
FIG. 10 is a flowchart of an example process that may be performed by a device in accordance with techniques of this disclosure.

FIG. 10 is a flowchart of an example of a process 1000 that may be performed by a device in accordance with techniques of this disclosure (e.g., as described above with reference to FIGS. 5, 7, and 8). Before the start of the loop process, the system may have 1) synchronized to the cluster global time; and 2) reconfigured the display property to give enough front porch to adjust the phase and frequency. For example, in one embodiment, a vertical front porch increase from 9 to 105 and a horizontal front porch decrease from 128 to 64 to keep the same pixel clock for the 768×1280 60 Hz may be implemented.

At block 1002, the process 1000 includes determining a measured synchronization value (e.g., a measured VSYNC frequency or a measured VSYNC time) and a reference synchronization value (e.g., a reference VSYNC frequency or a reference VSYNC time).

In one embodiment, the measured synchronization value may be a measured VSYNC frequency, and the exemplary process 1002 may accumulate valid time periods (e.g., noise-filtered periods) to calculate average VSYNC frequency, which may be one implementation of the measured VSYNC frequency. In another embodiment, the measured synchronization value may be a measured VSYNC time, and the process 1002 may obtain current system time, which may be one implementation of the measured VSYNC time.

In one embodiment, the reference synchronization value may be a reference VSYNC frequency, which may be a predetermined target frequency. In another embodiment, the reference synchronization value may be a reference VSYNC time, and the process 1002 may derive a corresponding reference time from a network time source and a predetermined initial time, where the corresponding reference time may be one implementation of the reference VSYNC time. Before the start of phase lock loop, the system may have 1) synchronized to the cluster global time; and 2) tuned to the required frequency, say 60 Hz within 0.1% error. The predetermined initial time may be defined, for example, as Jan. 1, 1970 00:00:00.000 in its operating system.

At block 1004, the process 1000 includes generating a comparison value between the reference synchronization value (e.g., a reference VSYNC frequency or a reference VSYNC time) and the measured synchronization value (e.g., the measured VSYNC frequency or the measured VSYNC time). Examples of this comparison of the reference synchronization value with the measured synchronization value may include the output of the summer 556 of FIG. 5, the output 757 of the summer 756 of FIG. 7, and the output 857 of the summer 856 of FIG. 8. In one embodiment, the comparison value may be a comparison value between a reference VSYNC frequency and a measured VSYNC frequency. In another embodiment, the comparison value may be a comparison value between a reference VSYNC time and a measured VSYNC time. This comparison value may be the difference between the measured VSYNC time and the reference VSYNC time, and the difference may be noise-filtered.

At block 1006, the process 1000 includes adjusting a synchronization output (e.g., output of pixel clock or display property adjustment unit 564 of FIG. 5, the output 765 of the pixel clock or display property adjustment unit 764 of FIG. 7, the output 867 of the pixel clock or display property adjustment unit 864 of FIG. 8) based on the comparison value of the reference synchronization value with the measured synchronization value. In one embodiment, the synchronization output may be based on the measured and reference VSYNC frequencies. In another embodiment, the synchronization output may be based on the measured and reference VSYNC times, and the process 1000 may determine whether the noise-filtered comparison value is greater or less than one or more predetermined thresholds.

At block 1008, the process 1000 further includes displaying video data based on the synchronization output. In one embodiment, the synchronization output may be a signal to adjust a vertical front porch of VSYNC. If the measured VSYNC frequency is greater than the reference VSYNC frequency, the vertical front porch may be increased. If the measured VSYNC frequency is less than the reference VSYNC frequency, the vertical front porch may be decreased. In another embodiment, the vertical front porch may be adjusted based on the measured and reference VSYNC time. The exemplary process 1000 may update the one or more predetermined thresholds as the measured VSYNC time converges to the reference VSYNC time.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus for displaying video data comprising:
a display configured to display video data based in part on a synchronization output; and
a processor coupled to the display, the processor configured to
obtain a measured vertical synchronization (VSYNC) value and a reference VSYNC value by determining with the processor at least one of the reference VSYNC value and the measured VSYNC value based on a network time source, the measured VSYNC value being based in part on a VSYNC signal from the display;
generate the synchronization output based in part on a comparison value from comparing the reference VSYNC value with the measured VSYNC value; and
adjust timing of the video data based on the synchronization output.

2. The apparatus of claim 1, wherein the network time source comprises at least one of
a Precision Time Protocol (PTP) source;
a Global Positioning System (GPS) Pulse-Per-Second (PPS) source; or
a Network Time Protocol (NTP) source.

3. The apparatus of claim 1, wherein the reference VSYNC value comprises a reference VSYNC frequency and the measured VSYNC value comprises a measured VSYNC frequency, and wherein the measured VSYNC frequency is determined by an average synchronization frequency based on a time value from the network time source.

4. The apparatus of claim 1, wherein the reference VSYNC value comprises a reference VSYNC time, and the measured VSYNC value comprises a measured VSYNC time, and wherein the measured VSYNC time is determined by a time value from the network time source.

5. The apparatus of claim 4, wherein the reference VSYNC time is derived from the network time source.

6. The apparatus of claim 5, wherein the reference VSYNC time is derived based on a preselected common start time.

7. The apparatus of claim 1, wherein the synchronization output is further based on a digitally filtered output of the comparison value and a prediction function, the prediction function being based on the comparison value.

8. The apparatus of claim 1, wherein the video data comprises a portion of a tiled video signal.

9. The apparatus of claim 1, wherein the timing of the video data is adjusted further to have a refresh period of integer multiples of a predetermined refresh period denomination.

10. A method of displaying video data, the method comprising:
obtaining a measured vertical synchronization (VSYNC) value and a reference VSYNC value by determining with a processor at least one of the reference VSYNC value and the measured VSYNC value based on a network time source, the measured VSYNC value being based in part on a VSYNC signal from a display;
generating a synchronization output based in part on a comparison value from comparing the reference VSYNC value with the measured VSYNC value;
adjusting timing of the video data based on the synchronization output; and
displaying video data based in part on the synchronization output.

11. The method of claim 10, wherein the network time source is based on one of:
- a Precision Time Protocol (PTP) source;
- a Global Positioning System (GPS) Pulse-Per-Second (PPS) source; or
- a Network Time Protocol (NTP) source.

12. The method of claim 10, wherein the reference VSYNC value comprises a reference VSYNC frequency, and the measured VSYNC value comprises a measured VSYNC frequency, and wherein the measured VSYNC frequency is determined by an average synchronization frequency based on a time value from the network time source.

13. The method of claim 10, wherein the reference VSYNC value comprises a reference VSYNC time, and the measured VSYNC value comprises a measured VSYNC time, and wherein the measured VSYNC time is determined by a time value from the network time source.

14. The method of claim 10, wherein the reference VSYNC time is derived from the network time source.

15. The method of claim 10, wherein the synchronization output is further based on a digitally filtered output of the comparison value and a prediction function, the prediction function being based on the comparison value.

16. The method of claim 10, wherein the video signal comprises a portion of a tiled video signal.

17. The method of claim 10, wherein the timing of the video data is adjusted further to have a refresh period of integer multiples of a predetermined refresh period denomination.

18. A non-transitory computer-readable medium storing instructions that, when executed, cause at least one physical computer processor to perform a method of displaying video data, the method comprising:
- obtaining a measured vertical synchronization (VSYNC) value and a reference VSYNC value by determining with the at least one processor at least one of the reference VSYNC value and the measured VSYNC value based on a network time source, the measured VSYNC value being based in part on a VSYNC signal from a display;
- generating a synchronization output based in part on a comparison value from comparing the reference VSYNC value with the measured VSYNC value;
- adjusting timing of the video data based on the synchronization output; and
- displaying video data based in part on the synchronization output.

19. The non-transitory computer-readable medium of claim 18, wherein the network time source comprises at least one of
- a Precision Time Protocol (PTP) source;
- a Global Positioning System (GPS) Pulse-Per-Second (PPS) source; or
- a Network Time Protocol (NTP) source.

20. The non-transitory computer-readable medium of claim 18, wherein the reference VSYNC value comprises a reference VSYNC frequency, and the measured VSYNC value comprises a measured VSYNC frequency, and wherein the measured VSYNC frequency is determined by an average synchronization frequency based on a time value from the network time source.

21. The non-transitory computer-readable medium of claim 18, wherein the reference VSYNC value comprises a reference VSYNC time, and the measured VSYNC value comprises a measured VSYNC time, and wherein the measured VSYNC time is determined by a time value from the network time source.

22. The non-transitory computer-readable medium of claim 18, wherein the synchronization output is further based on a digitally filtered output of the comparison value and a prediction function, the prediction function being based on the comparison value.

23. The non-transitory computer-readable medium of claim 18, wherein the video data comprises a portion of a tiled video signal.

24. The non-transitory computer-readable medium of claim 18, wherein the timing of the video data is adjusted further to have a refresh period of integer multiples of a predetermined refresh period denomination.

25. An apparatus for displaying video data comprising:
- a means for displaying video data based in part on a synchronization adjustment value;
- a means for obtaining a measured vertical synchronization (VSYNC) value and a reference VSYNC value by determining at least one of the reference VSYNC value and the measured VSYNC value based on a network time source, the measured VSYNC value being based in part on a VSYNC signal from the display means;
- a means for generating the synchronization adjustment value based in part on a comparison value from comparing the reference VSYNC value with the measured VSYNC value; and
- a means for adjusting timing of the video data based on the synchronization adjustment value.

26. The apparatus of claim 25, wherein the reference VSYNC value comprises a reference VSYNC frequency, and the measured VSYNC value comprises a measured VSYNC frequency, and wherein the measured VSYNC frequency is determined by an average synchronization frequency based on a time value from the network time source.

27. The apparatus of claim 25, wherein the reference VSYNC value comprises a reference VSYNC time, and the measured VSYNC value comprises a measured VSYNC time, and wherein the measured VSYNC time is determined by a time value from the network time source, the reference VSYNC time being derived from the network time source.

28. The apparatus of claim 25, wherein the synchronization output is further based on a digitally filtered output of the comparison value and a prediction function, the prediction function being based on the comparison value.

29. The apparatus of claim 25, wherein the video data comprises a portion of a tiled video signal.

30. The apparatus of claim 25, wherein the timing of the video data is adjusted further to be have a refresh period of integer multiples of a predetermined refresh period denomination.

* * * * *